JOHN G. ROTH.
Improvement in Chimney Cowls.
No. 119,885. Patented Oct. 10, 1871.
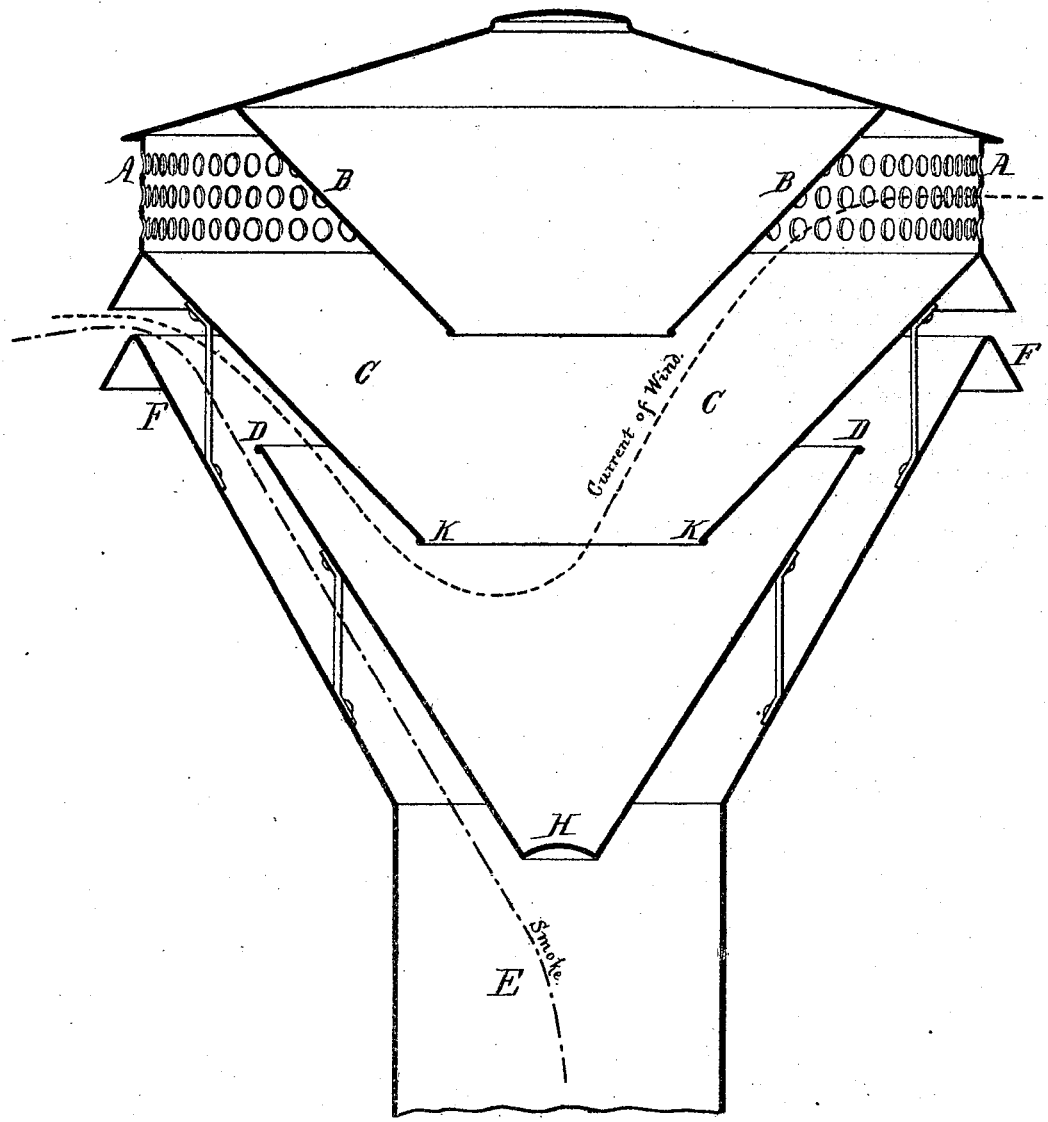

UNITED STATES PATENT OFFICE.

JOHN G. ROTH, OF NEW YORK, N. Y.

IMPROVEMENT IN CHIMNEY-COWLS.

Specification forming part of Letters Patent No. 119,885, dated October 10, 1871; antedated September 25, 1871.

*To all whom it may concern:*

Be it known that I, JOHN G. ROTH, of the city, county, and State of New York, have invented a new and useful Improvement in Ventilator and Chimney-Cap; and I do hereby declare that the following is a full, clear, and exact description thereof, which will enable others skilled in the art to make and use the same, reference being had to the accompanying drawing forming part of this specification, in which—

Similar letters of reference indicate like parts.

My invention has for its object to furnish an improved ventilator, reliable in its operation, for the purposes of creating draught for chimneys and ventilating. It consists in the construction and combination of the various parts, as hereinafter more fully described.

The wind is introduced through holes A, strikes against flange B, goes through the opening at C, and escapes through the opening at D. The smoke, passing through pipe E, comes in contact with current of air or draught at, D passing out together at F, thereby obtaining my object.

What I claim as my invention is—

A ventilator or chimney-cap having funnel H, in combination with funnel K and flange B, and constructed as above described, arranged and operating substantially in the manner and for the purposes set forth.

JOHN G. ROTH.

Witnesses:
   NATHANIEL GILL,
   A. WEDEKIND. (166)